(12) United States Patent
Nakayama

(10) Patent No.: US 11,459,140 B2
(45) Date of Patent: Oct. 4, 2022

(54) BOTTLE

(71) Applicant: YOSHINO KOGYOSHO CO., LTD., Tokyo (JP)

(72) Inventor: Tadayori Nakayama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 12 days.

(21) Appl. No.: 17/132,083

(22) Filed: Dec. 23, 2020

(65) Prior Publication Data
US 2021/0197996 A1 Jul. 1, 2021

(30) Foreign Application Priority Data
Dec. 27, 2019 (JP) .............................. JP2019-238761

(51) Int. Cl.
*B65D 1/02* (2006.01)

(52) U.S. Cl.
CPC ......... *B65D 1/0207* (2013.01); *B65D 1/0284* (2013.01); *B65D 2501/0009* (2013.01)

(58) Field of Classification Search
CPC ................ B65D 1/0207; B65D 1/0284; B65D 2501/0009
USPC ......................................... 215/384, 375, 382
See application file for complete search history.

(56) References Cited

U.S. PATENT DOCUMENTS

| | | | | |
|---|---|---|---|---|
| 4,108,324 A | * | 8/1978 | Krishnakumar | ..... B65D 1/0276 215/373 |
| 5,178,289 A | * | 1/1993 | Krishnakumar | ... B65D 79/0084 215/382 |
| 5,205,434 A | * | 4/1993 | Brunson | ............... B65D 1/0284 220/608 |
| 5,287,978 A | * | 2/1994 | Young | .................. B65D 1/0284 220/608 |
| 5,732,838 A | * | 3/1998 | Young | .................. B65D 23/102 215/375 |
| 6,019,236 A | * | 2/2000 | Slat | ....................... B65D 1/0284 220/608 |
| 6,065,624 A | * | 5/2000 | Steinke | ................ B65D 1/0276 220/675 |
| 6,276,546 B1 | * | 8/2001 | Davis | ................... B65D 1/0284 215/373 |

(Continued)

FOREIGN PATENT DOCUMENTS

JP 2007-030974 A 2/2007

*Primary Examiner* — Steven A. Reynolds
*Assistant Examiner* — Prince Pal
(74) *Attorney, Agent, or Firm* — Oliff PLC

(57) ABSTRACT

According to the present invention, there is provided a bottle formed of a synthetic resin material in a cylindrical shape with a bottom, the bottle includes a bottom portion which includes a bottom wall portion and a heel portion, in which the bottom wall portion includes an inner peripheral wall portion and a depressed wall portion, a plurality of concave portions are formed on the inner peripheral wall portion, the plurality of concave portions are located on the inner peripheral wall portion at least in a portion including a lower end edge of the inner peripheral wall portion, a plurality of convex portions are formed at a connecting portion between the inner peripheral wall portion and the depressed wall portion, and the plurality of concave portions and the plurality of convex portions are provided alternately in the circumferential direction.

4 Claims, 3 Drawing Sheets

(56) References Cited

U.S. PATENT DOCUMENTS

| | | | | |
|---|---|---|---|---|
| 6,585,123 B1* | 7/2003 | Pedmo | | B65D 1/0276 |
| | | | | 215/373 |
| 6,634,517 B2* | 10/2003 | Cheng | | B65D 1/0276 |
| | | | | 215/373 |
| 6,932,230 B2* | 8/2005 | Pedmo | | B65D 79/0084 |
| | | | | 215/381 |
| D522,368 S * | 6/2006 | Darr | | D9/520 |
| D527,643 S * | 9/2006 | Gottlieb | | D9/520 |
| 7,198,164 B2* | 4/2007 | Yourist | | B65D 1/0223 |
| | | | | 215/381 |
| 7,703,618 B2* | 4/2010 | Derrien | | B65D 1/0284 |
| | | | | 220/606 |
| 7,732,035 B2* | 6/2010 | Pedmo | | B65D 1/0276 |
| | | | | 215/373 |
| D630,515 S * | 1/2011 | Bretz | | D9/520 |
| 8,113,369 B2* | 2/2012 | Mast | | B65D 1/44 |
| | | | | 215/381 |
| 8,240,493 B2* | 8/2012 | Lane | | B65D 1/42 |
| | | | | 215/381 |
| 8,443,995 B2* | 5/2013 | Ungrady | | B65D 1/0223 |
| | | | | 215/381 |
| 8,524,349 B2* | 9/2013 | Protais | | B65D 1/0284 |
| | | | | 215/373 |
| 8,567,624 B2* | 10/2013 | Coley, Jr. | | B65D 23/102 |
| | | | | 215/384 |
| 8,875,921 B2* | 11/2014 | Hermel | | B65D 1/0284 |
| | | | | 220/628 |
| 9,415,891 B2* | 8/2016 | Hermel | | B65D 1/0284 |
| 9,422,076 B2* | 8/2016 | Lane | | B65D 1/46 |
| 9,745,095 B2* | 8/2017 | Hermel | | B65D 1/0284 |
| 9,957,077 B2* | 5/2018 | Dornbach | | B65D 1/0261 |
| 10,196,168 B2* | 2/2019 | Pierre | | B65D 1/0284 |
| 10,604,296 B2* | 3/2020 | Kick | | B65D 1/16 |
| 2004/0000533 A1* | 1/2004 | Kamineni | | B65D 1/0276 |
| | | | | 215/373 |
| 2004/0022976 A1* | 2/2004 | Kato | | B65D 79/0084 |
| | | | | 264/523 |
| 2004/0164047 A1* | 8/2004 | White | | B65D 1/32 |
| | | | | 215/382 |
| 2004/0211746 A1* | 10/2004 | Trude | | B65D 79/0081 |
| | | | | 206/508 |
| 2006/0138075 A1* | 6/2006 | Roubal | | B65D 1/0261 |
| | | | | 215/373 |
| 2007/0039918 A1* | 2/2007 | Lane | | B65D 79/0084 |
| | | | | 215/381 |
| 2007/0045220 A1* | 3/2007 | Pedmo | | B65D 1/0284 |
| | | | | 215/375 |
| 2007/0084821 A1* | 4/2007 | Bysick | | B65D 1/0284 |
| | | | | 215/373 |
| 2008/0073316 A1* | 3/2008 | Stowitts | | B65D 79/0084 |
| | | | | 215/381 |
| 2008/0083696 A1* | 4/2008 | Nievierowski | | B65D 79/0084 |
| | | | | 215/384 |
| 2008/0251487 A1* | 10/2008 | Semersky | | B65D 1/0215 |
| | | | | 264/537 |
| 2010/0163513 A1* | 7/2010 | Pedmo | | B65D 79/0081 |
| | | | | 215/370 |
| 2010/0297375 A1* | 11/2010 | Protais | | B65D 1/0284 |
| | | | | 428/36.92 |
| 2010/0326950 A1* | 12/2010 | Lane | | B65D 1/0284 |
| | | | | 215/381 |
| 2011/0011873 A1* | 1/2011 | Miura | | B65D 79/0081 |
| | | | | 220/609 |
| 2011/0094922 A1* | 4/2011 | Carew | | B65D 79/0084 |
| | | | | 206/524.6 |
| 2013/0043209 A1* | 2/2013 | Wurster | | B65B 3/04 |
| | | | | 220/669 |
| 2013/0082024 A1* | 4/2013 | Howell | | B65D 79/0084 |
| | | | | 215/381 |
| 2013/0087568 A1* | 4/2013 | Hermel | | B65D 1/0284 |
| | | | | 220/600 |
| 2013/0134125 A1* | 5/2013 | Pedmo | | B65D 23/102 |
| | | | | 215/381 |
| 2013/0180943 A1* | 7/2013 | Kurihara | | B65D 79/0081 |
| | | | | 215/374 |
| 2013/0213926 A1* | 8/2013 | Kurihara | | B65D 79/0081 |
| | | | | 215/371 |
| 2013/0270214 A1* | 10/2013 | Huels | | B65D 23/001 |
| | | | | 215/377 |
| 2014/0034659 A1* | 2/2014 | Nakayama | | B65D 1/0276 |
| | | | | 220/609 |
| 2015/0041426 A1* | 2/2015 | Oguchi | | B65D 1/0276 |
| | | | | 215/382 |
| 2015/0259090 A1* | 9/2015 | Dorn | | B65D 1/0207 |
| | | | | 215/371 |
| 2015/0367979 A1* | 12/2015 | Tanaka | | B65D 79/0081 |
| | | | | 215/374 |
| 2016/0167825 A1* | 6/2016 | Dachs | | B29C 49/48 |
| | | | | 425/522 |
| 2016/0288946 A1* | 10/2016 | Pierre | | B65D 1/0284 |
| 2016/0304233 A1* | 10/2016 | Hermel | | B65D 1/0207 |
| 2016/0340072 A1* | 11/2016 | Pettersson | | B65D 1/0284 |
| 2017/0137199 A1* | 5/2017 | Tanaka | | B65D 79/0081 |
| 2017/0267394 A1* | 9/2017 | Lane | | B65D 1/0284 |
| 2018/0162579 A1* | 6/2018 | Kado | | B65D 1/0284 |
| 2018/0265242 A1* | 9/2018 | Okuyama | | B29C 49/78 |
| 2019/0217985 A1* | 7/2019 | Bou | | B29C 49/06 |
| 2019/0322405 A1* | 10/2019 | Nakayama | | B65D 1/0276 |
| 2020/0189785 A1* | 6/2020 | Fonseca | | B65D 1/0284 |

* cited by examiner

BOTTLE

CROSS-REFERENCE TO RELATED APPLICATION

Priority is claimed on Japanese Patent Application No. 2019-238761, filed Dec. 27, 2019, the content of which is incorporated herein by reference.

BACKGROUND OF THE INVENTION

Field of the Invention

The present invention relates to a bottle.

Description of Related Art

From the related art, as a bottle formed of a synthetic resin material in a cylindrical shape with a bottom, for example, as shown in Japanese Unexamined Patent Application, First Publication No. 2007-30974, there is a known configuration in which a bottom portion includes a bottom wall portion having a ground contact portion located on an outer peripheral edge portion, and a tubular heel portion extending upward from the outer peripheral edge of the ground contact portion, and the bottom wall portion includes an inner peripheral wall portion extending upward from an inner peripheral edge of the ground contact portion, and a depressed wall portion extending inward in a radial direction from an upper side of the inner peripheral wall portion.

However, in the bottle of the related art, if the bottle is made thin, when a compressive load is applied in a vertical direction with the contents sealed in, that is, when a live load is applied, there is a possibility that the ground contact portion bending toward the inside of the bottle and being divided in a circumferential direction.

Therefore, an object of the present invention is to provide a bottle in which, even if the bottle is made thin, when a live load is applied, it is possible to prevent the ground contact portion from being easily bent toward the inside of the bottle and being divided in the circumferential direction.

SUMMARY OF THE INVENTION

The present invention has adopted the following means to solve the aforementioned problems. That is, according to a first aspect of the present invention, there is provided a bottle formed of a synthetic resin material in a cylindrical shape with a bottom. The bottle includes a bottom portion which includes a bottom wall portion and a tubular heel portion, the bottom wall portion having a ground contact portion located on an outer peripheral edge portion, and the tubular heel portion extending upward from the outer peripheral edge of the ground contact portion. The bottom wall portion includes an inner peripheral wall portion and a depressed wall portion, the inner peripheral wall portion extending upward from the inner peripheral edge of the ground contact portion, and the depressed wall portion extending inward in a radial direction from an upper side of the inner peripheral wall portion. A plurality of concave portions are formed on the inner peripheral wall portion over an entire length in a circumferential direction at intervals in the circumferential direction. The plurality of concave portions are located on the inner peripheral wall portion at least in a portion including a lower end edge of the inner peripheral wall portion, a plurality of convex portions are formed at a connecting portion between the inner peripheral wall portion and the depressed wall portion over the entire length in the circumferential direction at intervals in the circumferential direction. The plurality of concave portions and the plurality of convex portions are provided alternately in the circumferential direction.

According to the bottle of the first aspect, the plurality of concave portions are formed on the inner peripheral wall portion at intervals in the circumferential direction over the entire length in the circumferential direction. Accordingly, rigidity of the inner peripheral wall portion is increased, and it is possible to suppress deformation of the inner peripheral wall portion when a compressive load (live load) in the vertical direction is applied to the bottle with the contents sealed therein. Moreover, the concave portions are located on the inner peripheral wall portion at least in a portion including the lower end edge of the inner peripheral wall portion. Accordingly, the rigidity of a boundary portion between the inner peripheral wall portion and the ground contact portion is increased, and it is possible to suppress bending of the ground contact portion toward the inside of the bottle that causes the ground contact portion to be divided in the circumferential direction when a live load is applied.

Further, the convex portions are formed in the connecting portion between the inner peripheral wall portion and the depressed wall portion, and the concave portions and the convex portions are provided alternately in the circumferential direction. Accordingly, a portion of the connecting portion at which the convex portions are located is formed into a chamfered shape that gently connects the inner peripheral wall portion and the depressed wall portion with few steps, and it is possible to suppress the concentration of stress on this portion. Further, the plurality of convex portions are formed on the connecting portion at intervals in the circumferential direction over the entire length in the circumferential direction. As a result, the chamfered shape can be provided on the connecting portion over the entire region in the circumferential direction, and even if the bottle is made thin, when a live load is applied to the bottle, it is possible to prevent deformation that becomes the starting point of bending of the ground contact portion from occurring on the bottom wall portion.

According to the bottle of a second aspect of the present invention, in the bottle of the first aspect, the plurality of convex portions are integrally formed on both the connecting portion and the depressed wall portion, and protruding heights of the plurality of convex portions may decrease toward an inside in a radial direction.

According to the bottle of the second aspect, the convex portions are integrally formed on both the connecting portion and the depressed wall portion. As a result, due to the chamfered shape, the inner peripheral wall portion and the depressed wall portion can be gently connected reliably with few steps.

Further, the protruding height of the convex portions decreases inward in the radial direction. This makes it possible to smoothly connect the inner end portions of the convex portions in the radial direction and the surface of the depressed wall portion, and it is possible to suppress the concentration of stress on the inner end portions of the convex portions in the radial direction when a live load is applied to the bottle.

According to the bottle of a third aspect of the present invention, in the bottle of the first or second aspect, vertical positions of upper end portions of the plurality of concave portions and vertical positions of outer end portions of the plurality of convex portions in the radial direction may be equivalent to each other, and radial positions of the upper end portions of the plurality of concave portions and radial positions of the outer end portions of the plurality of convex portions in the radial directions are equivalent to each other.

According to the bottle of the third aspect, the vertical positions of the upper end portions of the concave portions and the vertical positions of the outer end portions of the convex portions in the radial direction are equivalent to each other, and the radial positions of the upper end portions of the concave portions and the radial positions of the outer end portions of the convex portions in the radial direction are equivalent to each other. As a result, the upper end portion of the concave portion and the outer end portion of the convex portion in the radial direction are close to each other in the circumferential direction. Therefore, in the bottom wall portion, a portion that is vertically or radially close to one of the upper end portion of the concave portion and the outer end portion of the convex portion in the radial direction can be supported from both sides in the circumferential direction by the other one of the upper end portion of the concave portion and the outer end portion of the convex portion in the radial direction. As a result, when a live load is applied to the bottle, it is possible to reliably prevent deformation which becomes a starting point of bending of the ground contact portion from occurring on the bottom wall portion.

According to the bottle of the present invention, even if the bottle is made thin, it is possible to prevent the ground contact portion from being easily bent toward the inside of the bottle and being divided in the circumferential direction when a live load is applied.

DETAILED DESCRIPTION OF THE INVENTION

Figure 1:
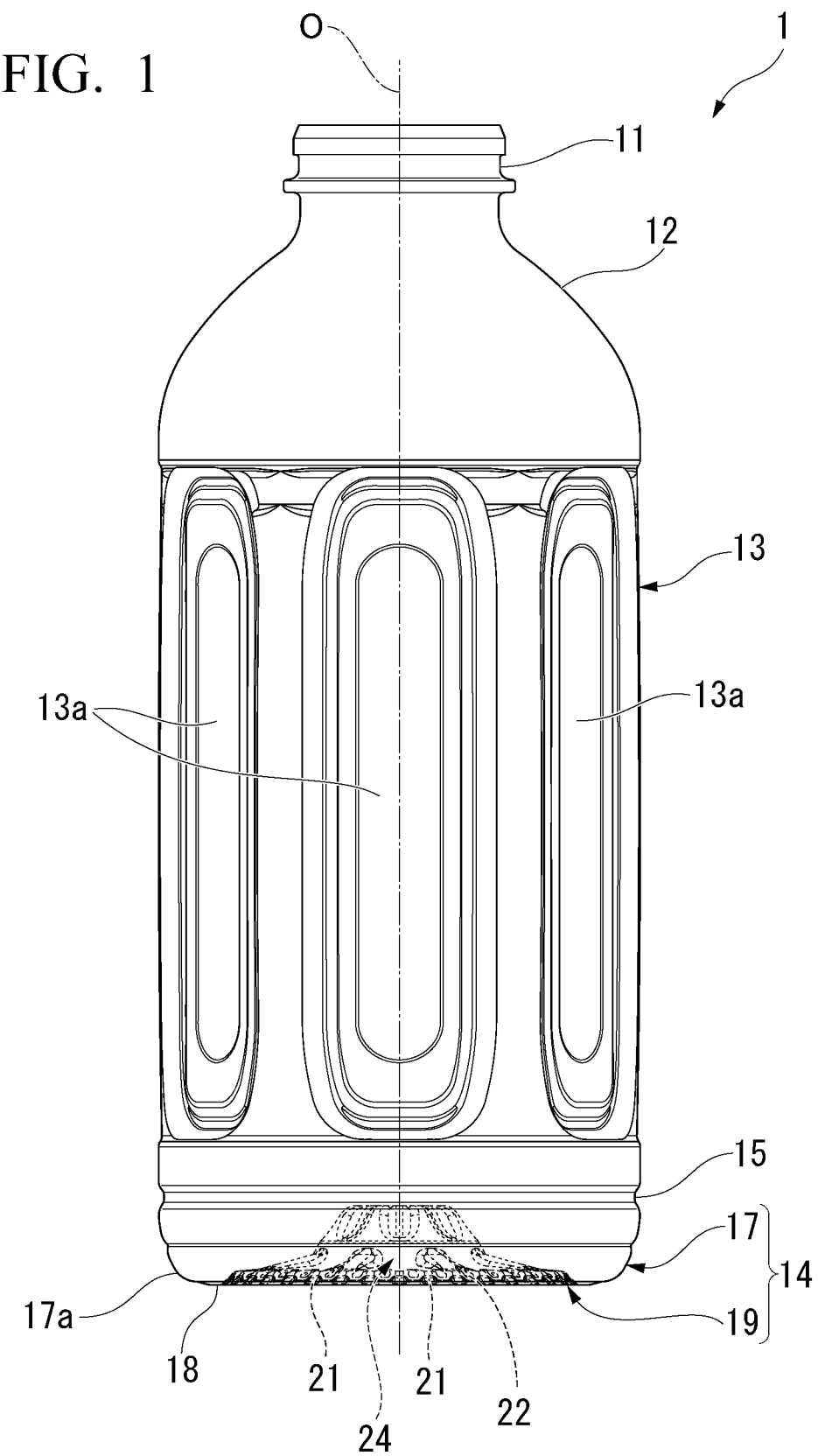
FIG. 1 is a side view of a bottle shown as an embodiment of the present invention.

Hereinafter, a bottle according to an embodiment of the present invention will be described referring to the drawings.

As shown in FIG. 1, the bottle 1 according to the present embodiment is equipped with a mouth portion 11, a shoulder portion 12, a body portion 13 and a bottom portion 14, and has a schematic configuration in which the mouth portion 11, the shoulder portion 12, the body portion 13 and the bottom portion 14 are connected in that order with a central axis of each positioned on a common axis. An internal volume of the bottle 1 has, for example, a size in which contents of 200 ml or more and 4000 ml or less are filled. In the shown example, the bottle 1 is sized to be used to fill 500 ml of the contents.

Hereinafter, the common axis is referred to as a bottle axis O, the mouth portion 11 side in the bottle axis O direction is referred to as an upper side, the bottom portion 14 side in the bottle axis O direction is referred to as a lower side, a direction along the bottle axis O is referred to as a vertical direction, a direction intersecting the bottle axis O when viewed from the vertical direction is referred to as a radial direction, and a direction which orbits around the bottle axis O is referred to as a circumferential direction.

The bottle 1 is formed by blow molding a preform formed into a cylindrical shape with a bottom by injection molding, and is integrally formed of a synthetic resin material. A cap (not shown) is mounted on the mouth portion 11. The mouth portion 11, the shoulder portion 12, the body portion 13, and the bottom portion 14 each have a circular cross-sectional shape orthogonal to the bottle axis O.

A plurality of rectangular panel portions 13a which are long in the vertical direction are formed on the body portion 13 at intervals in the circumferential direction. In the body portion 13, an annular groove 15 extending continuously over the entire circumference is formed at a lower end portion located below the panel portion 13a. An outer diameter of a part of the lower end portion of the body portion 13, the part which is located below the annular groove 15, is reduced in diameter toward the lower side.

The bottom portion 14 includes a bottom wall portion 19 in which the ground contact portion 18 is located on the outer peripheral edge portion, and a tubular heel portion 17 extending upward from the outer peripheral edge of the ground contact portion 18.

Figure 3:
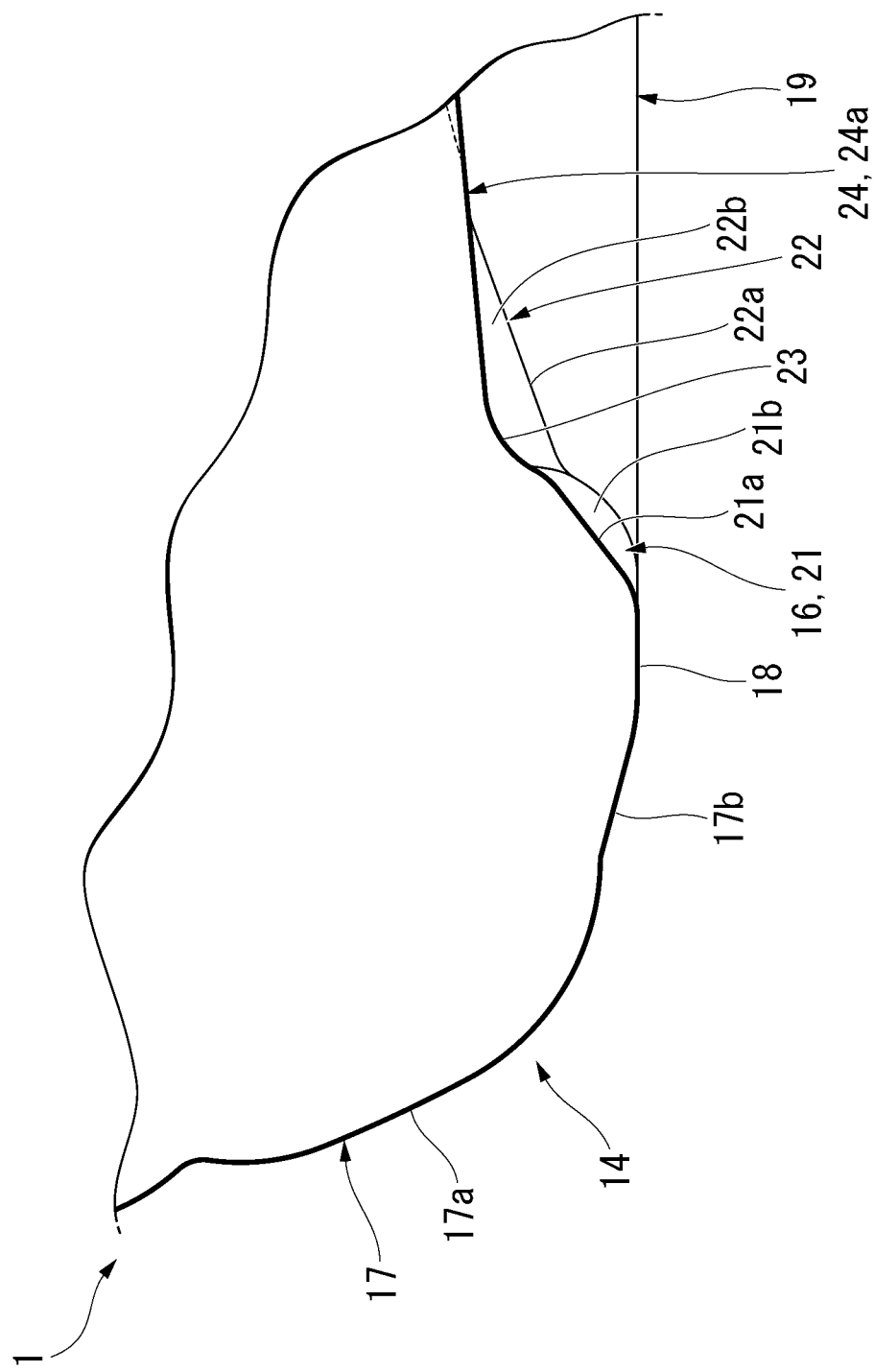
FIG. 3 is a cross-sectional view along a line III-III of FIG. 2.

The heel portion 17 is formed in a curved surface shape that protrudes outward in the radial direction. An upper end opening edge of the heel portion 17 is connected to a lower end opening edge of the body portion 13. A diameter of the upper end opening edge of the heel portion 17 is smaller than a diameter of the lower end opening edge of the body portion 13. A step portion is provided between the upper end opening edge of the heel portion 17 and the lower end opening edge of the body portion 13. The lower end opening edge of the heel portion 17 is connected to the outer peripheral edge of the bottom wall portion 19, that is, the outer peripheral edge of the ground contact portion 18. As shown in FIG. 3, the heel portion 17 includes an upper heel portion 17a connected to the lower end opening edge of the body portion 13, and a lower heel portion 17b connected to the outer peripheral edge of the ground contact portion 18. The upper heel portion 17a is longer than the lower heel portion 17b in the vertical cross-sectional view in the vertical direction. In the vertical cross-sectional view, a radius of curvature of the heel portion 17 is the same over the entire circumference.

The bottom wall portion 19 includes an inner peripheral wall portion 16 extending upward from the inner peripheral edge of the ground contact portion 18, and a depressed wall portion 24 extending inward in the radial direction from the upper side of the inner peripheral wall portion 16.

The inner peripheral wall portion 16 extends inward in the radial direction as it goes upward. The inner peripheral wall portion 16 is formed in a curved surface shape that protrudes inward in the radial direction. As the inner peripheral wall portion 16, for example, a configuration that exhibits a linear shape in the vertical cross-sectional view may be adopted.

A connecting portion 23 between the inner peripheral wall portion 16 and the depressed wall portion 24 is formed in a curved surface shape that is recessed outward in the radial direction. In the vertical cross-sectional view, the radius of curvature of the inner peripheral wall portion 16 is greater than the radius of curvature of the connecting portion 23. In the vertical cross-sectional view, the radius of curvature of the inner peripheral wall portion 16 may be equal to or less than the radius of curvature of the connecting portion 23.

The depressed wall portion 24 extends upward from the upper side of the inner peripheral wall portion 16 toward the inside in the radial direction, and is formed in a multi-stage tubular shape. The depressed wall portion 24 may extend straight from the upper side of the inner peripheral wall portion 16 toward the inside in the radial direction. The depressed wall portion 24 has a lower wall portion 24a extending upward from the inner end portion in the radial direction of the connecting portion 23 toward the inside in the radial direction, and a ridged tubular upper wall portion 24b extending upward from the inner end portion in the radial direction of the lower wall portion 24a.

Groove portions 25 extending in the radial direction are formed on the lower wall portion 24a. The groove portions 25 are formed over the entire length of the lower wall portion 24a in the radial direction. The outer end portions of the groove portions 25 in the radial direction open toward the connecting portion 23. The inner end portions of the groove portions 25 in the radial direction open toward the inside of the upper wall portion 24b. The depth of the groove portions 25 becomes deeper from the outside to the inside in the radial direction. The plurality of groove portions 25 are provided at intervals in the circumferential direction.

The peripheral wall of the upper wall portion 24b has a diameter which is reduced upward.

Figure 2:
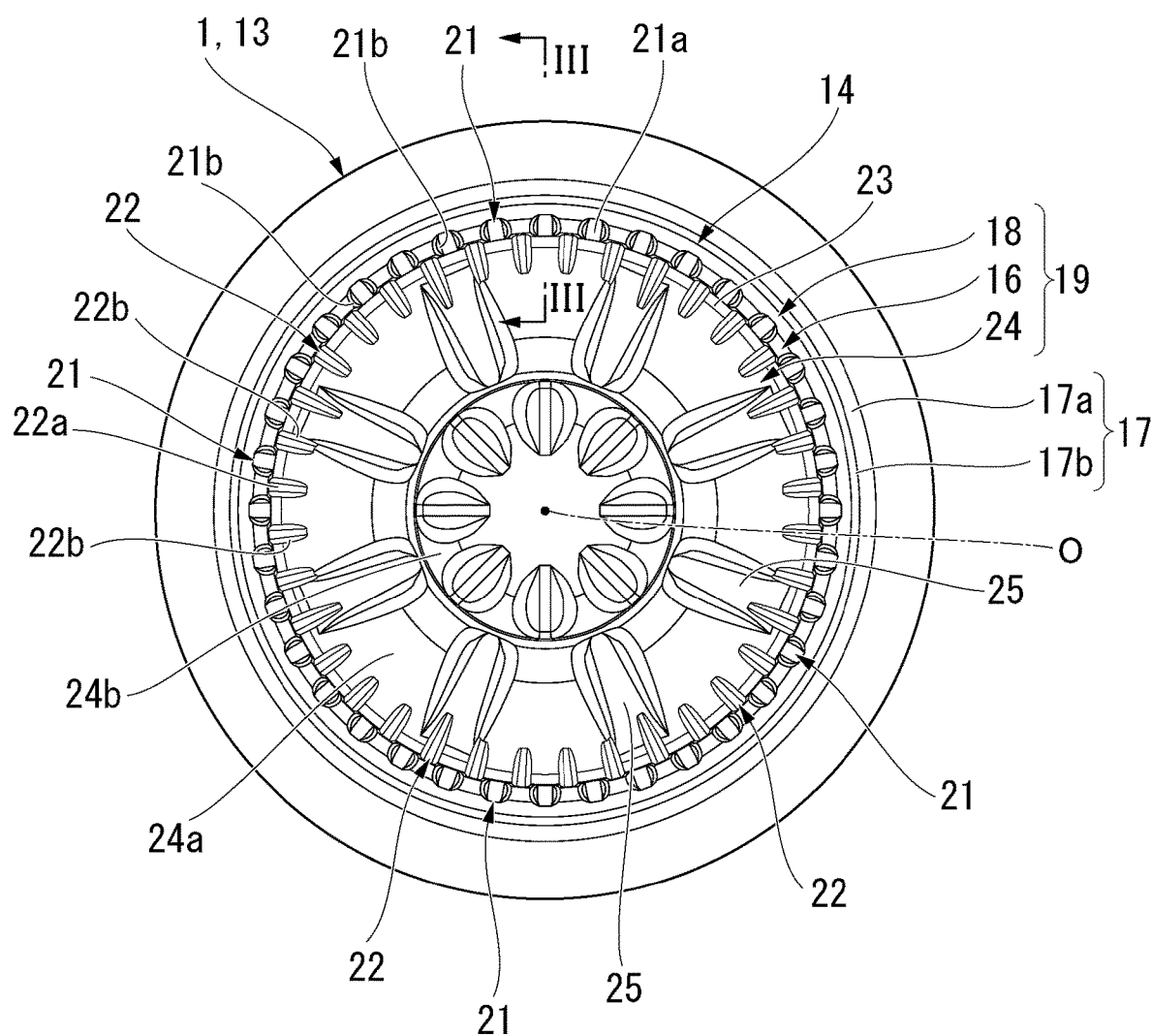
FIG. 2 is a bottom view of the bottle shown in FIG. 1.

Further, in the present embodiment, as shown in FIG. 2, a plurality of concave portions 21 are formed on the inner peripheral wall portion 16 at intervals in the circumferential direction over the entire length in the circumferential direction. The concave portions 21 are located on the inner peripheral wall portion 16 at least in a portion including the lower end edge of the inner peripheral wall portion 16. The concave portions 21 are integrally formed in both the ground contact portion 18 and the inner peripheral wall portion 16. The concave portions 21 are located below the inner end portion of the connecting portion 23 in the radial direction. In the shown example, the concave portions 21 are formed over the entire region of the inner peripheral wall portion 16 in the vertical direction and the inner peripheral edge portion of the ground contact portion 18. As shown in FIG. 3, the concave portions 21 are recessed outward in the radial direction in an obliquely upward direction.

The concave portions 21 are formed in a groove shape extending in the vertical direction. The concave portions 21 are defined by bottom surfaces 21a facing inward in the radial direction, and pairs of side surfaces 21b extending inward in the radial direction from both end portions of the bottom surfaces 21a in the circumferential direction and opposite to each other in the circumferential direction. The bottom surfaces 21a of the concave portions 21 extend inward in the radial direction as they go upward. The bottom surfaces 21a of the concave portions 21 extend linearly in the vertical cross-sectional view. The pairs of side surfaces 21b of the concave portions 21 extend away from each other in the circumferential direction and inward in the radial direction from the bottom surfaces 21a. The concave portions 21 have rectangular shapes in which pairs of sides extend in the circumferential direction and the remaining pairs of sides extend in the vertical direction when viewed from the radial direction. As shown in FIG. 2, the sizes of the concave portions 21 in the circumferential direction is equal to the distance between the concave portions 21 adjacent to each other in the circumferential direction. The sizes of the concave portions 21 in the circumferential direction may be set to be smaller than the distance between the concave portions 21 adjacent to each other in the circumferential direction.

A plurality of convex portions 22 are formed on the connecting portion 23 at intervals in the circumferential direction over the entire length in the circumferential direction. In the shown example, the convex portions 22 are formed over the entire region of the connecting portion 23 in the radial direction, and the outer peripheral portion of the lower wall portion 24a of the depressed wall portion 24. As shown in FIG. 3, the convex portions 22 protrude obliquely downward and inward in the radial direction.

The convex portions 22 are integrally formed on both the connecting portion 23 and the depressed wall portion 24. A protruding height of the convex portions 22 decreases from the outside to the inside in the radial direction. The sizes of the convex portions 22 in the circumferential direction decrease from the outside to the inside in the radial direction.

The convex portions 22 are formed in ridge shapes extending in the radial direction. The convex portions 22 are defined by top surfaces 22a facing downward, and pairs of side surfaces 22b extending upward from both end portions of the top surfaces 22a in the circumferential direction. The protruding heights of the convex portions 22 represents lengths of the convex portions 22 along the direction of the normal line to the surface of the connecting portion 23 and the depressed wall portion 24. The top surfaces 22a of the convex portions 22 extend upward and inward in the radial direction. The top surfaces 22a of the convex portions 22 extends linearly in the vertical cross-sectional view. The pairs of side surfaces 22b of the convex portions 22 extend away from each other in circumferential direction and upward from the top surfaces 22a. When viewed from the vertical direction, the convex portions 22 have rectangular shapes in which pairs of sides extend in the circumferential direction and the remaining pairs of sides extend in the radial direction. As shown in FIG. 2, the sizes in the circumferential direction of the convex portions 22 at the outer end portion in the radial direction are smaller than the interval between the convex portions 22 adjacent to each other in the circumferential direction. The sizes in the circumferential direction of the convex portions 22 at the outer end portion in the radial direction may be equal to the distance between the convex portions 22 adjacent to each other in the circumferential direction.

As shown in FIG. 2, the convex portions 22 and the concave portions 21 are provided alternately in the circumferential direction. The sizes of the outer end portions of the convex portions 22 in the circumferential direction and the sizes of the upper end portions of the concave portions 21 in the circumferential direction are equivalent to each other. The sizes of the convex portions 22 in the radial direction are greater than the sizes of the concave portions 21 in the vertical direction. The sizes of the convex portions 22 in the circumferential direction are smaller than the sizes of the groove portions 25 in the circumferential direction, and the sizes of the concave portions 21 in the circumferential direction are smaller than the sizes of the groove portions 25 in the circumferential direction. The inner end portion of one convex portion 22 in the radial direction is located at the outer end portion of the groove portions 25 in the radial direction.

The vertical positions of the outer end portions of the convex portions 22 in the radial direction and the vertical positions of the upper end portions of the concave portions 21 in the radial direction are equivalent to each other. The radial positions of the outer end portions of the convex portions 22 in the radial direction and radial positions of the upper end portions of the concave portions 21 in the radial direction are equivalent to each other. As shown in FIG. 3, in the vertical cross-sectional view, the vertical positions of the upper end portions of the concave portions 21 and the vertical positions of intermediate portions in the vertical direction of the outer end portions of the convex portions 22 in the radial direction are equivalent to each other. In the vertical cross-sectional view, the upper end portions of the concave portions 21 are located above the lower end edge at the outer end portions of the convex portions 22 in the radial direction.

As described above, according to the bottle 1 according to the present embodiment, a plurality of concave portions 21 are formed on the inner peripheral wall portion 16 at intervals in the circumferential direction over the entire length in the circumferential direction. As a result, the rigidity of the inner peripheral wall portion 16 is increased, and it is possible to suppress deformation of the inner peripheral wall portion 16 when a compressive load (live load) in the vertical direction is applied to the bottle with the contents are sealed therein. Moreover, the concave portions 21 are located on the inner peripheral wall portion 16 at least in a portion including the lower end edge of the inner peripheral wall portion 16. Accordingly, the rigidity of a boundary portion between the inner peripheral wall portion 16 and the ground contact portion 18 is increased, and it is possible to suppress bending of the ground contact portion 18 toward the inside of the bottle 1 that causes the ground contact portion 18 to be divided in the circumferential direction when a live load is applied.

Further, the convex portions 22 is formed in the connecting portion 23 between the inner peripheral wall portion 16 and the depressed wall portion 24, and the concave portions 21 and the convex portions 22 are provided alternately in the circumferential direction. Accordingly, as shown in FIG. 3, the portion of the connecting portion 23 at which the convex portions 22 are located is formed into a chamfered shape that gently connects the inner peripheral wall portion 16 and the depressed wall portion 24 with few steps, and it is possible to suppress the concentration of stress on this portion. Further, the plurality of convex portions 22 are formed on the connecting portion 23 at intervals in the circumferential direction over the entire length in the circumferential direction. As a result, the chamfered shape can be provided on the connecting portion 23 over the entire region in the circumferential direction, and even if the bottle is made thin, it is possible to prevent deformation that becomes the starting point of bending of the ground contact portion 18 from occurring on the bottom wall portion 19 when a live load is applied to the bottle 1.

Further, the convex portions 22 are integrally formed on both the connecting portion 23 and the depressed wall portion 24. As a result, due to the chamfered shape, the inner peripheral wall portion 16 and the depressed wall portion 24 can be reliably and gently connected with few steps.

Further, the protruding height of the convex portions 22 decreases inward in the radial direction. This makes it possible to smoothly connect the inner end portions of the convex portions 22 in the radial direction and the surface of the depressed wall portion 24, and it is possible to suppress the concentration of stress on the inner end portion of the convex portion 22 in the radial direction when a live load is applied to the bottle 1.

Further, the vertical positions of the upper end portions of the concave portions 21 and the vertical positions of the outer end portions of the convex portions 22 in the radial direction are equivalent to each other, and the radial positions of the upper end portions of the concave portions 21 and the radial positions of the outer end portions of the convex portions 22 in the radial direction are equivalent to each other. As a result, as shown in FIG. 2, the upper end portion of the concave portion 21 and the outer end portion of the convex portion 22 in the radial direction are close to each other in the circumferential direction. Therefore, in the bottom wall portion 19, a portion that is vertically or radially close to one of the upper end portion of the concave portion 21 and the outer end portion of the convex portion 22 in the radial direction can be supported from both sides in the circumferential direction by the other one of the upper end portion of the concave portion 21 and the outer end portion of the convex portion 22 in the radial direction. As a result, it is possible to reliably prevent deformation which becomes a starting point of bending of the ground contact portion 18 from occurring on the bottom wall portion 19 when a live load is applied to the bottle 1.

The technical scope of the present invention is not limited to the above-described embodiment, and various modifications can be made without departing from the spirit of the present invention.

The convex portions 22 may not be formed on the depressed wall portion 24, but may be formed only on the connecting portion 23.

The protruding height of the convex portions 22 may be made equal, for example, over the entire length in the radial direction.

The vertical positions the upper end portions of the concave portions 21 and the vertical positions of the outer end portions of the convex portions 22 in the radial direction may be different from each other. In addition, the radial positions of the upper end portions of the concave portions 21 and the radial positions of the outer end portions of the convex portions 22 in the radial direction may be different from each other. In addition, the upper end portions of the concave portions 21 and the outer end portions of the convex portions 22 in the radial direction may be separated from each other in the circumferential direction.

Further, the synthetic resin material forming the bottle 1 may be appropriately changed, for example, to polyethylene terephthalate, polyethylene naphthalate, amorphous polyester, or a blend material thereof.

Furthermore, the bottle 1 is not limited to the single-layer structure, but may be a stacked structure having an intermediate layer. Examples of the intermediate layer include a layer made of a resin material having a gas barrier property, a layer made of a recycled material, a layer made of a resin material having an oxygen absorption property, and the like.

Further, although the cross-sectional shape orthogonal to the bottle axis O of each of the mouth portion 11, the shoulder portion 12, the body portion 13 and the bottom portion 14 is a circular shape in the aforementioned embodiment, the cross-sectional shape is not limited thereto, and may be appropriately changed, for example, to a polygon shape or the like.

In addition, it is possible to replace the components in the embodiment with well-known components as appropriate without departing from the spirit of the present invention, and the embodiments and modified examples may be combined as appropriate.

What is claimed is:

1. A bottle formed of a synthetic resin material in a cylindrical shape with a bottom, the bottle comprising:
   a bottom portion which includes a bottom wall portion and a tubular heel portion, the bottom wall portion having a ground contact portion located on an outer peripheral edge portion, and the tubular heel portion extending upward from the outer peripheral edge of the ground contact portion,
   wherein the bottom wall portion includes an inner peripheral wall portion and a depressed wall portion, the inner peripheral wall portion extending upward from the inner peripheral edge of the ground contact portion, and the depressed wall portion extending inward in a radial direction from an upper side of the inner peripheral wall portion, a plurality of concave portions are formed on the inner peripheral wall portion over an entire length in a circumferential direction at intervals in the circumferential direction, the plurality of concave portions are located on the inner peripheral wall portion at least in a portion including a lower end edge of the inner peripheral wall portion, a plurality of convex portions are formed at a connecting portion between the inner peripheral wall portion and the depressed wall portion over the entire length in the circumferential direction at intervals in the circumferential direction, the plurality of concave portions and the plurality of convex portions are provided alternately in the circumferential direction, the plurality of concave portions are recessed outward in the radial direction and obliquely upward from a lower surface of the inner peripheral wall portion, and the plurality of convex portions protrude inward in the radial direction and obliquely downward from a lower surface of the connecting portion.

2. The bottle according to claim 1, wherein the plurality of convex portions are integrally formed on both the connecting portion and the depressed wall portion, and protruding heights of the plurality of convex portions decrease toward an inside in a radial direction.

3. The bottle according to claim 1, wherein upper end portions of the plurality of concave portions are positioned at the same vertical position as outer end portions of the plurality of convex portions in the radial direction, and upper end portions of the plurality of concave portions are positioned at the same radial position as the outer end portions of the plurality of convex portions in the radial direction.

4. The bottle according to claim 2, wherein upper end portions of the plurality of concave portions are positioned at the same vertical position as outer end portions of the plurality of convex portions in the radial direction, and the upper end portions of the plurality of concave portions are positioned at the same radial position as the outer end portions of the plurality of convex portions in the radial direction.

\* \* \* \* \*